Jan. 29, 1952  J. M. WRIGHTSON  2,583,620
SEPARATION OF ORGANIC COMPOUNDS
Filed June 28, 1947
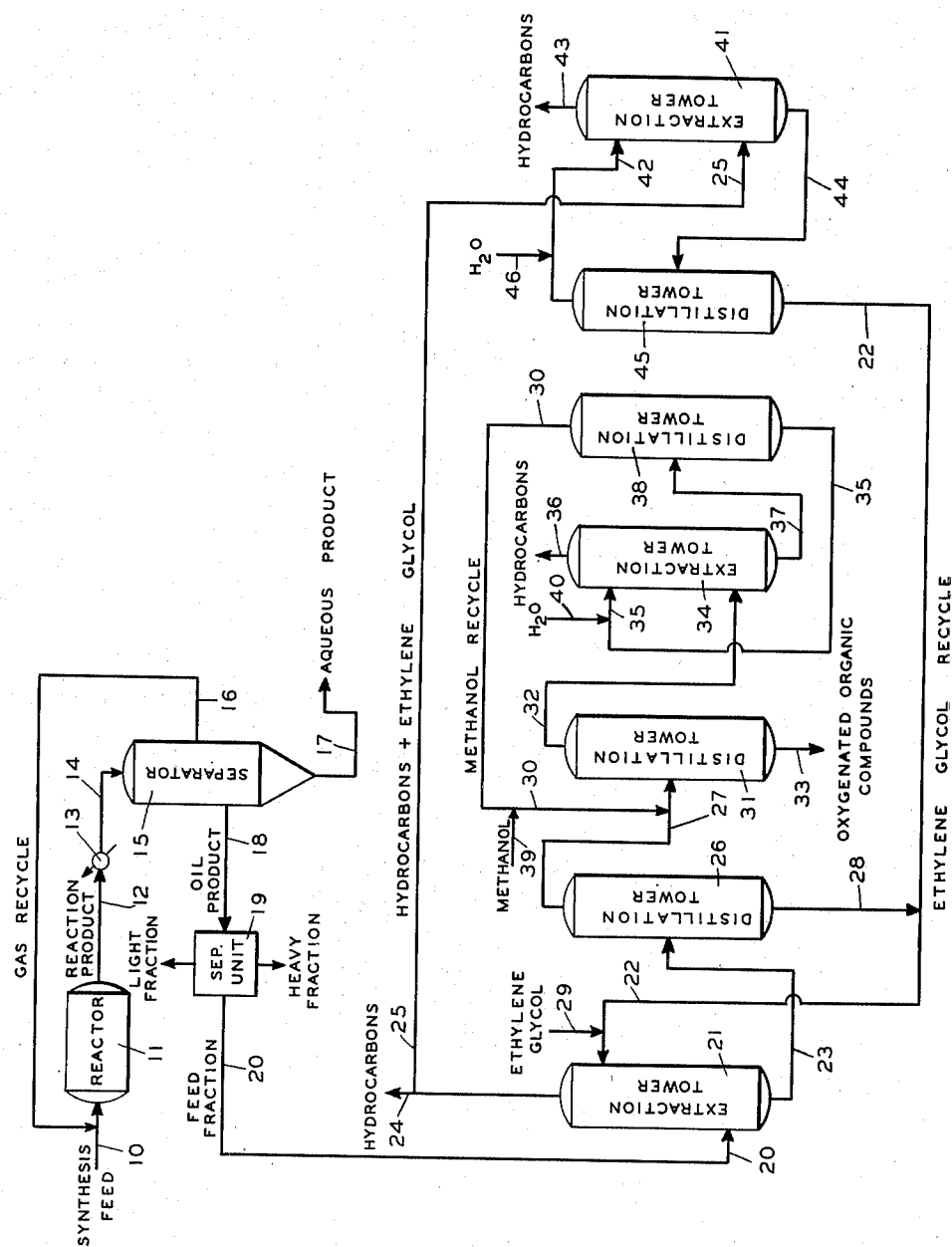
INVENTOR
JOHN M. WRIGHTSON
BY E. F. Liebrecht
J. H. Palmer
ATTORNEYS Patented Jan. 29, 1952

2,583,620

UNITED STATES PATENT OFFICE 2,583,620

SEPARATION OF ORGANIC COMPOUNDS

John M. Wrightson, North Bergen, N. J., assignor to The M. W. Kellogg Company, Jersey City, N. J., a corporation of Delaware Application June 28, 1947, Serial No. 757,912

16 Claims. (Cl. 260—450)

This invention relates to the separation of organic compounds and relates more particularly to the separation of organic compounds from the reaction product obtained in the reduction of oxides of carbon with hydrogen in the presence of a catalyst at elevated temperatures. Still more particularly, the invention relates to an improved process for the separation and recovery of oxygenated organic compounds and hydrocarbons obtained from the condensation of reactor gases produced in the catalytic hydrogenation of oxides of carbon.

In the hydrogenation of oxides of carbon in the presence of a catalyst at elevated temperatures, a reaction product is obtained in the form of reactor outlet gases at temperatures varying between about 300° F. to about 700° F. and containing hydrocarbons and oxygenated organic compounds comprising organic acids, alcohols, aldehydes, ketones, and esters. These gases are passed through one or more condensation zones in which they are cooled to temperatures within the range from about 40° F. to about 150° F. to effect separation of a condensate, this condensate ultimately separating into an aqueous phase and an oil or hydrocarbon-rich phase. Both phases comprise oxygenated organic compounds, those of lower molecular weight tending to remain in the aqueous phase while those of higher molecular weight tend to remain in the oil product or non-aqueous liquid phase.

I have found that the aforementioned oil product, or a fractionated portion thereof, comprising a mixture of hydrocarbons and oxygenated organic compounds, consisting of organic acids, alcohols, aldehydes, ketones and esters, may be subjected to extraction with a glycol solvent treating agent to extract the aforementioned oxygenated organic compounds from the oil, the particular glycol solvent treating agent selected having a boiling point higher than that of the oxygenated compounds subjected to extraction. In addition, I have found that in carrying out this extraction, optimum results are obtained in employing a glycol treating agent whose boiling point is below that of the lowest boiling hydrocarbon present in the aforementioned mixture, although the choice of a suitable glycol solvent treating agent is not necessarily restricted to employing a glycol solvent having the aforementioned characteristics. When the boiling point of the treating agent is approximately equal to or above the boiling point of the lowest boiling hydrocarbon component present in the mixture, a portion of the treating agent employed in the extraction step may distill over and necessitate further separation of hydrocarbons from the solvent treating agent in the raffinate thus produced.

The extract thus produced comprising a mixture of oxygenated organic compounds and proportionately large quantities of the solvent treating agent, also contains relatively smaller quantities of hydrocarbons. Upon separation of the solvent treating agent, I have found that the remaining mixture of oxygenated organic compounds and hydrocarbons can be contacted with a light alcohol treating agent and upon subsequent distillation of the mixture thus produced, relatively pure oxygenated organic compounds may be separated from the remaining hydrocarbons, the latter being taken overhead as their alcohol azeotropes. These azeotropes may be next resolved into their alcohol and hydrocarbon components by successive extraction and distillation as more fully shown in the process hereinafter described.

The present invention, is, therefore, particularly directed to a process as more fully hereinafter described for the separation and recovery of hydrocarbons and oxygenated organic compounds present in the oil product obtained from the condensation of reactor gases produced in the aforementioned catalytic hydrogenation of oxides of carbon. In general, the invention broadly comprises first subjecting the aforementioned oil product, or a fractionated portion thereof, to a first extraction treatment with a glycol solvent for oxygenated organic compounds present in the oil, to obtain an extract comprising oxygenated organic compounds and a minor portion of the hydrocarbons present. The extract thus obtained is transferred to a first distillation step to separate the solvent contained therein from oxygenated organic compounds and hydrocarbons. The separated solvent is next recycled to the first extraction step, and the mixture of oxygenated organic compounds and hydrocarbons obtained from the aforementioned distillation step is contacted with a light alcohol treating agent, to form a minimum boiling azeotrope with the hydrocarbons contained in this mixture. The resulting mixture of alcohol-hydrocarbon azeotropes and oxygenated organic compounds is transferred to a second distillation step to separate the oxygenated compounds from the azeotropes thus produced. The separated alcohol-hydrocarbon azeotropes are next subjected to a second extraction treatment with water to obtain an extract comprising the alcohol treating agent and water and a raffinate comprising the separated hydrocarbons. The extract thus produced is transferred to a third distillation step in which the alcohol treating agent is separated from the water and is recycled to the second distillation step, while water thus separated is recycled to the second extraction step.

The raffinate obtained from the above-mentioned first extraction step comprises a mixture of hydrocarbons and small quantities of absorbed glycol solvent treating agent. This mixture is next subjected to a third extraction treatment with water to obtain an extract comprising the solvent treating agent and water and a raffinate comprising the separated hydrocarbons. The extract thus produced is subjected to distillation to separate the solvent treating agent from water. Water thus separated is recycled to the above-mentioned extraction step while the separated solvent treating agent is recycled to the first extraction step.

It is, therefore, an object of this invention to provide an improved process for the separation of hydrocarbons, organic acids, alcohols, aldehydes, ketones, and esters from mixtures thereof.

Another object of the invention is to provide an improved process for the separation of hydrocarbons and oxygenated organic compounds present in the oil product obtained from the condensation of reactor gases produced in the catalytic hydrogenation of oxides of carbon.

Other objects and advantages inherent in the present invention will be apparent in the following more detailed disclosure.

The accompanying drawing illustrates, diagrammatically, one form of the apparatus employed and capable of carrying out one embodiment of my invention. While the invention will be described in detail by reference to one embodiment of the process employing the apparatus illustrated in the drawing, it should be noted that it is not intended that the invention be limited to the embodiment as illustrated, but is capable of other embodiments which may extend beyond the scope of the apparatus illustrated. Pumps, compressors, valves, and other mechanical elements necessary to effect the transfer of liquids and vapors and to maintain the conditions of temperature and pressure necessary to carry out the function of the apparatus, are omitted in order to simplify the description. It will be understood, however, that much equipment of this nature is necessary and will be supplied by those skilled in the art.

Referring to the drawing, the aforementioned synthesis feed comprising a reaction mixture of hydrogen and an oxide of carbon, at varying mol ratios such as 2:1, respectively, is supplied through line 10 and transferred through this line to a synthesis reaction vessel, represented in the drawing by reactor 11. In reactor 11, the reaction mixture is contacted with a hydrogenation catalyst, such as a reduced iron or cobalt catalyst, at temperatures varying between about 300° F. and about 700° F., and at pressures varying between about atmospheric pressure and about 500 pounds per square inch, and is carried out according to conventional fixed bed or fluid bed operations. The resulting reaction product obtained from reactor 11 is withdrawn through line 12. This product is in the vapor form, substantially as it comes from the reactor within the aforementioned temperature range, containing water, hydrocarbons and oxygenated organic compounds comprising organic acids, alcohols, aldehydes, ketones, and esters, and is first cooled to condense substantially large quantities of normally liquid components. Conveniently, condensation may be effected in a plurality of cooling stages which are represented diagrammatically in the drawing by cooler 13 with which line 12 connects. From cooler 13, the resulting mixture of condensate and uncondensed gases passes through line 14 to a separator 15. In the latter, uncondensed gases are withdrawn through line 16 and recycled through this line to the synthesis feed in line 10, with which line 16 connects. The condensate in separator 15 separates as a lower aqueous phase and an upper oil phase. The aqueous phase is drawn off from the bottom of separator 15 through line 17 for further use or treatment outside the scope of the present process, and the oil phase is drawn off at an intermediate point through line 18. It should be noted that apparatus embodying more than one separation stage may be employed if desired; for example, primary and secondary stages may be introduced, operating successively and respectively at temperatures of about 150° F. and about 100° F.

The oil product liquid phase withdrawn from separator 15 through line 18 comprises a mixture of hydrocarbons and oxygenated organic compounds consisting of organic acids, alcohols, aldehydes, ketones, and esters. This oil product or a fractionated portion thereof, boiling within the range from about 150° F. to about 400° F. is next subjected to further treatment in the process hereinafter described. Where it is desired to treat a fractionated portion of the aforementioned oil product in line 18, the total oil product may be transferred through line 18 to any suitable separation zone or series of separation zones, illustrated in the drawing by separation unit 19, from which an oil fraction boiling within the aforementioned temperature range may be separated in the manner known to those skilled in the art. This oil fraction is withdrawn from separation unit 19 through line 20 and comprises a mixture of hydrocarbons and the aforementioned oxygenated organic compounds. This mixture is next subjected to extraction treatment with a glycol solvent treating agent to extract oxygenated organic compounds from the oil, the particular glycol selected having a boiling point higher than that of the oxygenated compounds subjected to extraction. Accordingly, I prefer to use ethylene glycol, which boils at a temperature varying between about 388.4° F. and about 392° F. and has been found overall generally satisfactory as a solvent treating agent in effecting extraction of substantially all of the oxygenated compounds present in the aforementioned mixture. In addition to employing ethylene glycol as a solvent treating agent in the aforementioned extraction step, I may use other glycol solvents, which are higher boiling than ethylene glycol thus effecting total extraction of all oxygenated compounds present in the aforementioned mixture. In this respect, it should be noted that in carrying out the aforementioned extraction, it is desirable to employ a glycol treating agent having a boiling point lower than that of the lowest boiling hydrocarbon present in the hydrocarbon-oxygenated organic compounds mixture. Where the boiling point of the glycol treating agent is equal to or higher boiling than the boiling point of the lowest boiling hydrocarbon component present in the mixture, a portion of the solvent in varying quantities, may distill over and necessitate further separation of hydrocarbons from the solvent treating agent in the raffinate thus produced, as provided for and more fully hereinafter described, in the process of the invention. Hence, in addition to ethylene glycol as an overall generally suitable solvent treating agent, other glycols may be successfully employed such as 1,3-butanediol; 1,6-hexanediol; diethylene glycol, isopropylene glycol, triethylene glycol and trimethylene glycol. Of these, I have found 1,3-butanediol, which boils at approximately 399.2° F. and 1,6-hexanediol, which boils at approximately 482° F., generally preferable as glycol solvents which are higher boiling than ethylene glycol, although it should be understood that other glycols which meet the aforementioned requirement may be successfully employed as solvent treating agents in accordance with the process of the invention.

The aforementioned mixture of hydrocarbons and oxygenated organic compounds comprising organic acids, alcohols, aldehydes, ketones, and esters, is transferred through line 20 to a low point in an extraction tower 21. In tower 21, the mixture introduced through line 20 is subjected to intimate countercurrent contact with a selected glycol solvent treating agent, such as ethylene glycol, which is introduced into tower 21 at an upper point through line 22. The treating agent and the aforementioned mixture are contacted in tower 21 under conditions effective to absorb in the treating agent substantially all of the oxygenated organic compounds present. The extract thus produced is withdrawn from the bottom of tower 21 through line 23. The separated hydrocarbons in tower 21 may be withdrawn overhead through line 24 for further use or treatment outside the scope of the present process. In instances where the boiling point of the glycol treating agent is equal to or higher than the boiling point of the lowest boiling hydrocarbon present in the aforementioned mixture, a portion of the solvent may distill over in the raffinate withdrawn through line 24. This mixture may be next transferred from line 24 through line 25, with which line 24 connects, for further separation of hydrocarbons from the glycol solvent in the process hereinafter described.

The extract from the bottom of tower 20 comprises a mixture of the glycol solvent treating agent, the aforementioned oxygenated organic compounds and proportionately small quantities of hydrocarbons. This mixture is next transferred through line 23 to a distillation tower 26. In tower 26 the mixture is heated under conditions of temperature and pressure effective to distill overhead the lower boiling material which comprises a mixture of oxygenated organic compounds and proportionately small quantities of hydrocarbons, which are withdrawn through line 27 for further treatment in the process hereinafter described. The higher boiling fraction from tower 26, comprising the separated glycol treating agent, is withdrawn through line 28 and transferred into line 22, with which line 28 connects, for further use in tower 21 as previously described. Make-up solvent is supplied through line 29, with which line 22 connects.

As described above the overhead from tower 26 comprising a mixture of oxygenated organic compounds and proportionately small quantities of hydrocarbons is withdrawn through line 27. This mixture is next contacted with a light alcohol such as methanol, ethanol or propanol, to form minimum boiling azeotropes with hydrocarbons contained in the mixture. In this respect, it should be noted that any alcohol may be added to the aforementioned mixture, whose boiling point is below that of the lowest boiling oxygenated organic compound or hydrocarbon present, and which can form a minimum boiling azeotrope with these hydrocarbons. Any hydrocarbons which do not form an azeotrope with the added alcohol treating agent (for example, pentane which does not form a minimum boiling azeotrope with propanol) would be taken overhead together with the hydrocarbon-alcohol azeotropes upon subsequent distillation. Accordingly, a suitable light alcohol treating agent, such as methanol which is illustrated in the drawing, is added to the mixture of hydrocarbons and oxygenated organic compounds in line 27, through line 30. The mixture of oxygenated organic compounds and alcohol-hydrocarbon azeotropes thus produced, is next transferred through line 27 to a distillation tower 31. Tower 31 is heated under proper operating conditions of temperature and pressure effective to distill overhead the aforementioned methanol-hydrocarbon azeotropes which are withdrawn through line 32. Bottoms from tower 31 comprising a mixture of oxygenated organic compounds consisting of organic acids, alcohols, aldehydes, ketones, and esters are withdrawn through line 33 and may be subjected to further treatment for the separation of individual components in the manner known to those skilled in the art.

As described above, methanol-hydrocarbon azeotropes are distilled overhead from tower 31 and withdrawn through line 32. These azeotropes are next transferred through line 32 to a low point in an extraction tower 34. In order to effect separation of methanol and hydrocarbon components present in the aforementioned azeotropes, these azeotropes introduced into tower 34 through line 32 are subjected to intimate countercurrent contact with water, regulated to introduce sufficient quantities to remove methanol or the particular alcohol treating agent present, from hydrocarbons comprising the aforementioned azeotropic mixture in tower 34. Water thus employed is introduced into tower 34 at an upper point through line 35. Following countercurrent contact in tower 34 between the methanol-hydrocarbon azeotropes and the introduced water, separation is effected between an upper hydrocarbon phase and a lower aqueous phase comprising chiefly water containing small amounts of methanol. The upper phase in tower 34 thus obtained, comprising substantially pure hydrocarbons is withdrawn through line 36 and may be subjected to further treatment for the separation of individual hydrocarbon components in the manner known to those skilled in the art.

The lower aqueous phase from tower 34, containing small amounts of methanol, comprises the extract obtained from subjecting the methanol-hydrocarbon azeotropes, introduced into tower 34 through line 35, to countercurrent extraction with water. This extract is withdrawn from the bottom of tower 34 through line 37 and is transferred to a distillation tower 38. In tower 38 the aqueous methanol extract obtained from tower 34 is heated under proper operating conditions of temperature and pressure effective to dehydrate methanol or the particular selected alcohol treating agent. As a result of distillation in tower 38 an overhead is obtained comprising methanol which is withdrawn through line 30 and recycled through this line to line 27, with which line 30 connects, for further use as the alcohol treating agent in tower 31 in the process hereinbefore described. Make-up methanol is supplied through line 39, with which line 30 connects. Bottoms from tower 38 comprising water are transferred through line 35, for further use in tower 34 in the process hereinbefore described. Make-up quantities of water are supplied through line 40 with which line 35 connects.

As previously described, the mixture of hydrocarbons separated in tower 21 and withdrawn in the overhead raffinate through line 24 may also contain a portion of the glycol solvent treating agent, in instances where the boiling point of the glycol treating agent is equal to or higher than the boiling point of the lowest boiling hydrocarbon present. This mixture may be next transferred from line 34 through line 25, with which line 24 connects, to a low point in an extraction tower 41. In tower 41 the mixture introduced through line 25 is subjected to intimate countercurrent contact with water as a treating agent, which is introduced into tower 41 in an upper point through line 42. The hydrocarbon-glycol mixture and water are contacted in tower 41 under conditions effective to absorb in the water, substantially all of the glycol solvent present in the mixture passing through line 25. As a result of the extraction process in tower 41, an upper hydrocarbon or oil layer and a lower aqueous glycol layer are produced. The upper hydrocarbon layer from tower 41 is withdrawn as an overhead raffinate through line 43 and may be subjected to further treatment for the separation of individual hydrocarbon components in the manner known to those skilled in the art and outside the scope of the present process. The extract from tower 41, comprising an aqueous glycol layer is withdrawn as bottoms through line 44 and transferred to a distillation tower 45. Tower 45 is operated under proper conditions of temperature and pressure effective to distill water overhead which is withdrawn through line 42 and transferred through this line for further use in the extraction process in tower 41 as described above. Make-up water is introduced into line 42 through line 46 with which line 42 connects. Bottoms from tower 45 comprising the glycol solvent treating agent, substantially water-free, are withdrawn through line 22 and recycled through this line for further use as the solvent in tower 21 in the process hereinbefore described.

To recapitulate, this invention is directed to an improved process for the separation and recovery of oxygenated organic compounds and hydrocarbons obtained from the condensation of reactor gases produced in the catalytic hydrogenation of oxides of carbon. However, while the invention has been described as having a particular applicability to the separation of such compounds obtained from the source indicated, it should be noted that the process of the invention is not necessarily restricted to effect the desired separation of these compounds as derived from the aforementioned source. The process of the invention may be also successfully applied to the separation of any mixtures of the aforementioned compounds with regard to the source from which these mixtures may have been derived and without regard to the composition of such mixtures. In this respect, it should be noted that it is possible to introduce such mixtures directly into tower 21, through line 20 for treatment in the process hereinbefore described.

In addition, while a particular embodiment of this invention has been described for purposes of illustration, it should be understood that various modifications and adaptations thereof, which will be obvious to one skilled in the art, may be made within the spirit of the invention as set forth in the appended claims.

Having thus described my invention, what I claim and desire to secure by Letters Patent is:

1. In a process for the hydrogenation of oxides of carbon in which is recovered a hydrocarbon-rich phase comprising a mixture of hydrocarbons and oxygenated organic compounds as a product of said hydrogenation and boiling within the range between about 150° F. and about 400° F., the method of treating at least a portion of said hydrocarbon-rich phase which comprises subjecting said portion to a first extraction treatment with a glycol solvent for said oxygenated organic compounds wherein said solvent is higher boiling than the oxygenated organic compounds subjected to extraction, to obtain an extract comprising oxygenated organic compounds and a minor portion of said hydrocarbons and a raffinate comprising a major portion of said hydrocarbons, separately subjecting said extract to a first distillation to separate it into a relatively high-boiling fraction containing solvent and a relatively low-boiling fraction containing oxygenated organic compounds and hydrocarbons, contacting said relatively low-boiling fraction with a light alcohol treating agent to form a minimum boiling azeotrope with hydrocarbons contained in said fraction, subjecting the resulting mixture to a second distillation to separate oxygenated organic compounds from said alcohol-hydrocarbon azeotrope, subjecting said azeotrope to a second extraction treatment with water to obtain an extract comprising said alcohol treating agent and water and a raffinate comprising hydrocarbons, and subjecting said last-mentioned extract to a third distillation to separate it into a relatively low-boiling fraction containing said alcohol treating agent and a relatively high-boiling fraction containing water.

2. A method as defined by claim 1 wherein said glycol solvent is ethylene glycol.

3. A method as defined by claim 1 wherein said glycol solvent is 1,3-butanediol.

4. A method as defined by claim 1 wherein said glycol solvent is 1,6-hexanediol.

5. A method as defined by claim 1 wherein said light alcohol treating agent is methanol.

6. A method as defined by claim 1 wherein said light alcohol treating agent is ethanol.

7. A method as defined by claim 1 wherein said light alcohol treating agent is propanol.

8. In a process for the hydrogenation of oxides of carbon in which is recovered a hydrocarbon-rich phase comprising a mixture of hydrocarbons and oxygenated organic compounds as a product of said hydrogenation and boiling within the range between about 150° F. and about 400° F., the method of treating at least a portion of said hydrocarbon-rich phase which comprises subjecting said portion to a first extraction treatment with a glycol solvent for said oxygenated organic compounds wherein said solvent is higher boiling than the oxygenated organic compounds subjected to extraction, to obtain an extract comprising oxygenated organic compounds and a minor portion of said hydrocarbons and a raffinate comprising a major portion of said hydrocarbons, separately subjecting said extract to a first distillation to separate it into a relatively high-boiling fraction containing solvent and a relatively low-boiling fraction containing oxygenated organic compounds and hydrocarbons, contacting said relatively low-boiling fraction with a light alcohol treating agent to form a minimum boiling azeotrope with hydrocarbons contained in said fraction, subjecting the resulting mixture to a second distillation to separate oxygenated organic compounds from said alcohol-hydrocarbon azeotrope, and subjecting said azeotrope to a second extraction treament with water to obtain an extract comprising said alcohol treating agent and water and a raffinate comprising hydrocarbons.

9. In a process for the hydrogenation of oxides of carbon in which is recovered a hydrocarbon-rich phase comprising a mixture of hydrocarbons and oxygenated organic compounds as a product of said hydrogenation and boiling within the range between about 150° F. and about 400° F., the method of treating at least a portion of said hydrocarbon-rich phase which comprises subjecting said portion to a first extraction treatment with a glycol solvent for said oxygenated organic compounds wherein said solvent is higher boiling than the oxygenated organic compounds subjected to extraction, to obtain an extract comprising oxygenated organic compounds and a minor portion of said hydrocarbons and a raffinate comprising a major portion of said hydrocarbons, contacting said extract with a light alcohol treating agent to form a minimum boiling azeotrope with hydrocarbons contained in said extract, separately recovering oxygenated organic compounds and said alcohol-hydrocarbon azeotrope from the resulting mixture, and subjecting said azeotrope to a second extraction treatment with water to obtain an extract comprising said alcohol treating agent and water and a raffinate comprising hydrocarbons.

10. In a process for the hydrogenation of oxides of carbon in which is recovered a hydrocarbon-rich phase comprising a mixture of hydrocarbons and oxygenated organic compounds as a product of said hydrogenation and boiling within the range between about 150° F. and about 400° F., the method of treating at least a portion of said hydrocarbon-rich phase which comprises subjecting said portion to a first extraction treatment with a glycol solvent for said oxygenated organic compounds wherein said solvent is higher boiling than the oxygenated organic compounds subjected to extraction, to obtain an extract comprising oxygenated organic compounds and a minor portion of said hydrocarbons and a raffinate comprising a major portion of said hydrocarbons, contacting said extract with a light alcohol treating agent to form a minimum boiling azeotrope with hydrocarbons contained in said extract, and separately recovering oxygenated organic compounds and said alcohol-hydrocarbon azeotrope from the resulting mixture.

11. A method for treating a mixture of hydrocarbons and oil-soluble oxygenated organic compounds boiling within the range between about 150° F. and about 400° F. which comprises subjecting said mixture to a first extraction treatment with a glycol solvent for said oxygenated organic compounds wherein said solvent is higher boiling than the oxygenated organic compounds subjected to extraction, to obtain an extract comprising oxygenated organic compounds and a minor portion of said hydrocarbons and a raffinate comprising a major portion of said hydrocarbons, separately subjecting said extract to a first distillation to separate it into a relatively high-boiling fraction containing solvent and a relatively low-boiling fraction containing oxygenated organic compounds and hydrocarbons, contacting said relatively low-boiling fraction with a light alcohol treating agent to form a minimum boiling azeotrope with hydrocarbons contained in said fraction, subjecting the resulting mixture to a second distillation to separate oxygenated organic compounds from said alcohol-hydrocarbon azeotrope, subjecting said azeotrope to a second extraction treatment with water to obtain an extract comprising said alcohol treating agent and water and a raffinate comprising hydrocarbons, and subjecting said last-mentioned extract to a third distillation to separate it into a relatively low-boiling fraction containing said alcohol treating agent and a relatively high boiling fraction containing water.

12. A method for treating a mixture of hydrocarbons and oil-soluble oxygenated organic compounds boiling within the range between about 150° F. and about 400° F. which comprises subjecting said mixture to a first extraction treatment with a glycol solvent for said oxygenated organic compounds wherein said solvent is higher boiling than the oxygenated organic compounds subjected to extraction, to obtain an extract comprising oxygenated organic compounds and a minor portion of said hydrocarbons and a raffinate comprising a major portion of said hydrocarbons, separately subjecting said extract to a first distillation to separate it into a relatively high-boiling fraction containing solvent and a relatively low-boiling fraction containing oxygenated organic compounds and hydrocarbons, contacting said relatively low-boiling fraction with a light alcohol treating agent to form a minimum boiling azeotrope with hydrocarbons contained in said fraction, subjecting the resulting mixture to a second distillation to separate oxygenated organic compounds from said alcohol-hydrocarbon azeotrope, and subjecting said azeotrope to a second extraction treatment with water to obtain an extract comprising said alcohol treating agent and water and a raffinate comprising hydrocarbons.

13. A method for treating a mixture of hydrocarbons and oil-soluble oxygenated organic compounds boiling within the range between about 150° F. and about 400° F. which comprises subjecting said mixture to a first extraction treatment with a glycol solvent for said oxygenated organic compounds wherein said solvent is higher boiling than the oxygenated organic compounds subjected to extraction, to obtain an extract comprising oxygenated organic compounds and a minor portion of said hydrocarbons and a raffinate comprising a major portion of said hydrocarbons, contacting said extract with a light alcohol treating agent to form a minimum boiling azeotrope with hydrocarbons contained in said extract, separately recovering oxygenated organic compounds and alcohol-hydrocarbon azeotrope from the resulting mixture, and subjecting said azeotrope to a second extraction treatment with water to obtain an extract comprising said alcohol treating agent and water and a raffinate comprising hydrocarbons.

14. A method for treating a mixture of hydro-